United States Patent [19]

Ludwigsen

[11] Patent Number: 4,511,115
[45] Date of Patent: Apr. 16, 1985

[54] PASSIVE STRUCTURE WITH ENERGY ABSORBING CAPACITY

[75] Inventor: John S. Ludwigsen, Naperville, Ill.

[73] Assignee: Chicago Bridge & Iron Company, Oak Brook, Ill.

[21] Appl. No.: 574,348

[22] Filed: Jan. 27, 1984

[51] Int. Cl.³ ............................................. F16M 13/00
[52] U.S. Cl. ..................................... 248/562; 108/136; 248/580; 248/603
[58] Field of Search ................ 248/560, 562, 581, 584, 248/592, 593, 603, 613, 618, 619, 620; 108/136; 52/167; 267/151, 178

[56] References Cited

U.S. PATENT DOCUMENTS

| | | | |
|---|---|---|---|
| 807,314 | 1/1905 | Pepple | 248/619 X |
| 3,230,295 | 1/1966 | Short | 267/178 X |
| 3,419,238 | 12/1968 | Flory | 108/136 X |
| 3,465,997 | 9/1969 | Piske | 248/619 |
| 3,540,688 | 11/1970 | Schulte | 248/619 X |
| 3,794,277 | 2/1974 | Smedley et al. | 52/167 X |

FOREIGN PATENT DOCUMENTS 902388  1/1982  U.S.S.R. ................ 248/560

*Primary Examiner*—J. Franklin Foss
*Assistant Examiner*—David L. Talbott
*Attorney, Agent, or Firm*—Marshall, O'Toole, Gerstein, Murray & Bicknell

[57] ABSTRACT

A passive support structure comprises rigid compression members in which only compressive forces are generated, and extendable tensile members, which elongate as necessary to accommodate externally applied forces. The structure incorporates two spaced members, a lower base member and an upper support member, interconnected by a plurality of rigid compression members, the ends of which are pivotally attached to both the base and the support member. Because of the pivotal connections, only axial compressive forces can be generated within the compression members. Also interconnecting the base and support members are elastic tensile members, which yield as necessary to accommodate the applied force, and in which energy absorbing and dissipating elements can be incorporated.

5 Claims, 8 Drawing Figures

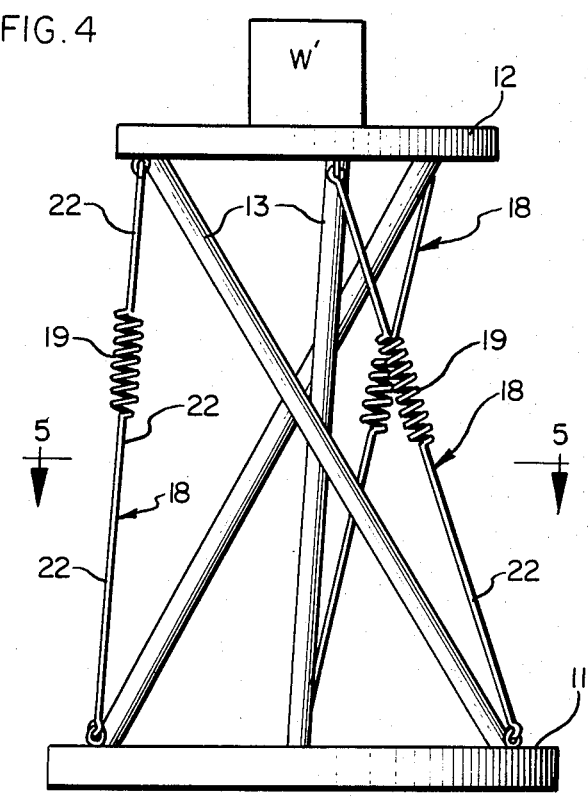
FIG. 4
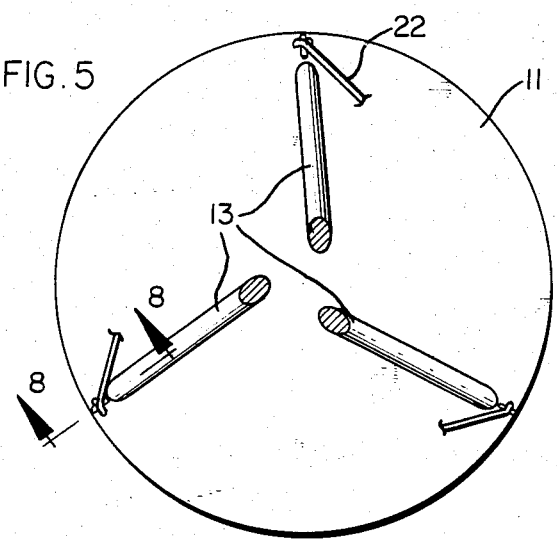
FIG. 5
FIG. 6
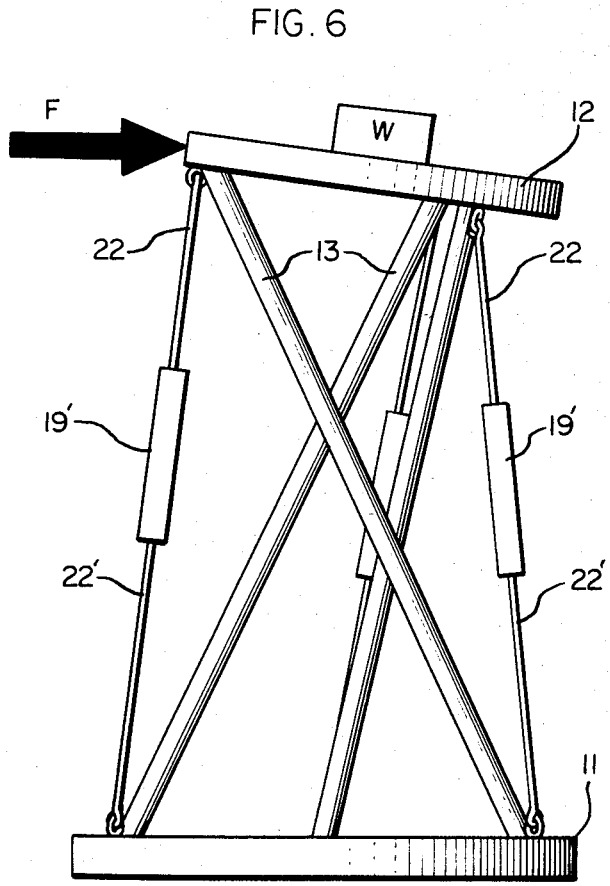
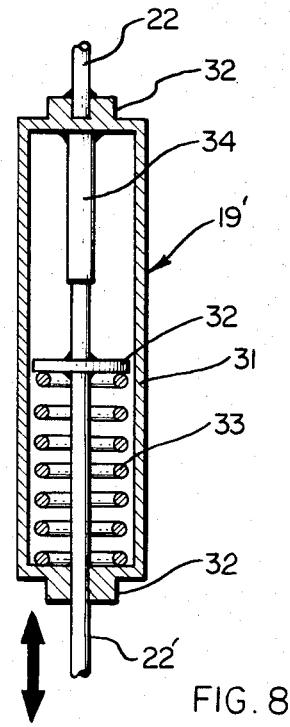
FIG. 7
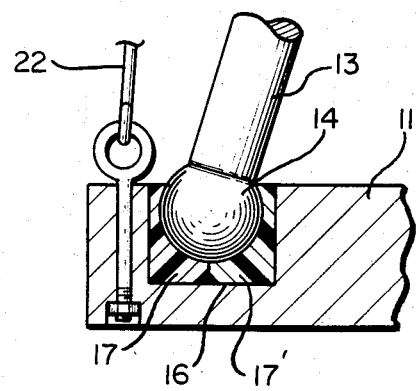
FIG. 8

PASSIVE STRUCTURE WITH ENERGY ABSORBING CAPACITY

The present invention relates to a passive support structure which yields as necessary to accommodate an applied force and which can be provided with energy absorbing capacity to dissipate the energy imparted to the structure by the force. The structure can also be tuned so that its natural frequency of oscillation differs significantly from that of a recurring applied force in order to prevent the creation of reinforced oscillations which might damage the structure.

Most support structures used for supporting piers, offshore oil drilling platforms, elevated water tanks and the like, are designed to be essentially rigid, i.e., the structure does not yield appreciably on the application of an external force. Because of the rigid nature of the structure, when an external force is applied there are created within the structure a variety of tensile, compressive and bending forces, as a result of which at least some of the structural members must be overdesigned. For example, a member which has adequate strength in resisting purely compressive forces may have little tensile strength. If such a structure is subjected to a bending force, however, there are created within the member tensile forces which might damage or destroy it, unless it is made much larger than necessary for supporting the purely compressive forces which it is intended to withstand.

Certain support structures are also subjected to forces which are applied at a more or less regular frequency, tending to create an oscillation within the support structure. If the oscillation of the structure coincides with the frequency of the applied force, the oscillations may be reinforced, leading to damage of the structure. Typical examples of such structures are those used to support machinery operating in a cyclic fashion, such as compressors or pile drivers, as well as structures resting on the sea bottom, such as piers, which are subject to more or less regular wave action. In order to avoid damage to such structures, it is desirable to be able to tune the structure to a natural frequency of oscillation which differs substantially from that of the force applied. In addition, it is also desirable to provide means within the structure for absorbing and dissipating the externally applied energy, thereby inhibiting the development of oscillations.

In accordance with the invention, there is provided a support structure comprising rigid compression members in which only compressive forces are generated, and extendable tensile members which elongate as necessary to accommodate externally applied forces. The structure incorporates two spaced members, a lower base member and an upper support member, interconnected by a plurality of rigid compression members, the ends of which are pivotally attached to both the base and the support member. Because of the pivotal connections, only axial compressive forces can be generated within the compression members. Also interconnecting the base and support members are a plurality of elastic tensile members, which yield as necessary to accommodate the applied force, and in which energy absorbing and dissipating elements can be incorporated.

The invention will be better understood from the following detailed description thereof taken together with the accompanying drawings, in which:

FIG. 4 is a front elevational view of the embodiment of FIG. 1 supporting a weight of greater size than that in FIG. 2;

FIG. 5 is a sectional view along the line 5—5 of FIG. 4;

Figure 1:
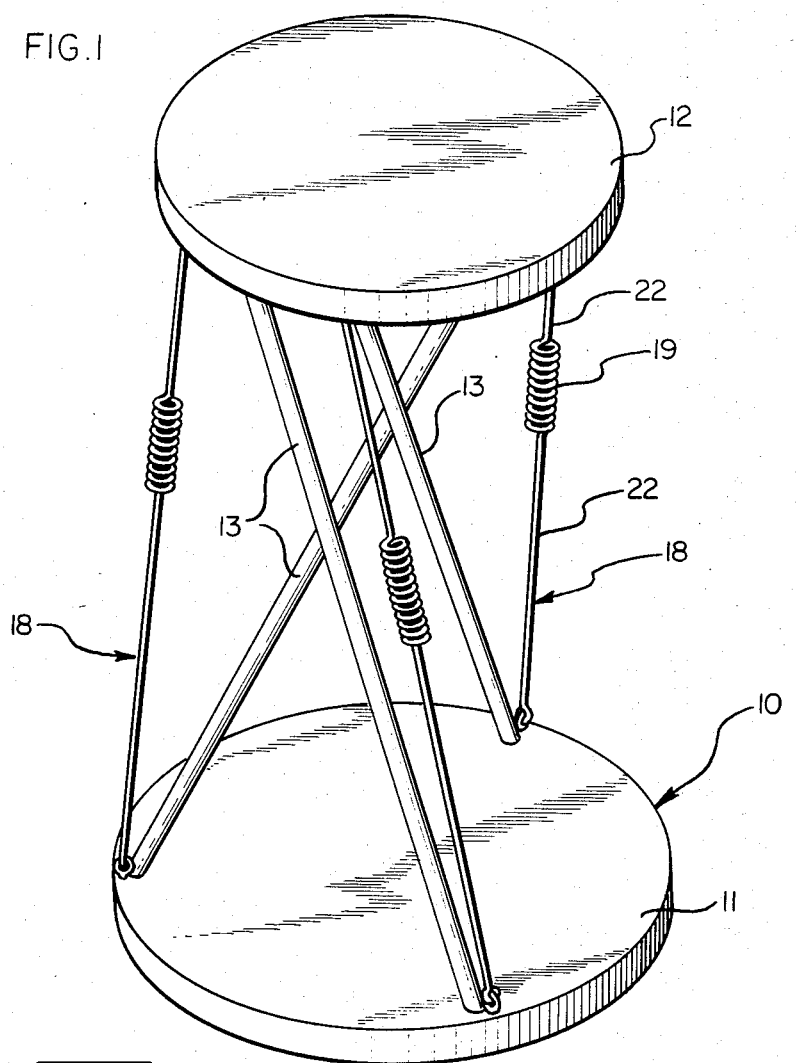
FIG. 1 is a perspective view of one embodiment of the invention.

FIG. 6 is a front elevational view of a preferred embodiment of the invention,, incorporating a shock-absorber displaced by the application of a horizontal force F; and FIG. 7 is a schematic representation of a preferred shock- and energy-absorbing spring assembly used in the embodiment of FIG. 6; and FIG. 8 is a detail of a pivotal connection of one of the compression members of FIG. 1 to the base member.

DETAILED DESCRIPTION

As shown in the drawings, a support 10 in accordance with the invention comprises a lower base member 11 having a size, thickness and rigidity appropriate for the loads which may be imposed on the structure. Base member 11 can be a circular disc as shown, but other appropriate configurations can also be used. Vertically spaced from base member 11 is an upper support member 12, also shown as a circular disc, having a size and configuration appropriate for the loads to be carried thereon.

Extending between base member 11 and support member 12 are a plurality of elongated, rigid compression members 13, each of which has its respective ends connected to the base member and the support member by pivotal connecting means, such as that shown in FIG. 8, which permits free pivotal movement of the compression member throughout a range appropriate to the loads to be carried by the support. As shown in FIG. 8, the pivotal connection may comprise a spherical ball 14 joined to the end of compression member 13 and a split seat 16 comprising similar sections 17 and 17' defining an interior spherical cavity which receives ball 14. Seat 16 is retained within base member 11 by any appropriate means, not shown. A similar pivotal connection is formed at the upper ends of each compression member 13 to provide a similar pivotal movement relative to upper support member 12. Because each of compression members 13 is pivotally connected at its ends to the base and support members as described, it will be seen that, within the operating limits of the device, a bending moment in the compression members cannot be created by applying any force, regardless of its nature, to upper support member 12. Accordingly, any stress created within compression members 13 is purely compressive and directed along the longitudinal axis of each member.

The invention requires at least three compression members 13, between base and support members 11 and 12. In order to provide lateral stability, the compression members must be spaced about a closed curve, e.g., a circle, an ellipse or the like, in each of base member 11 and support member 12. In the preferred form of the invention the compression members 13 are equal in length and each closed curve is a circle in each of the base and support members 11 and 12 about which the pivotal connections of compression members 13 are symmetrically disposed.

Structure 10 also incorporates at least three elastic tensile members 18 shown schematically as consisting of a spring 19 connected by lengths of cable 22 to members 11 and 12. Tensile members 18 can exert a tensile force only and are incapable of exerting or resisting any compressive or bending forces. In addition to springs, suitable tension members include metallic or non-metallic cables, ropes or wires which behave elastically.

While at least three compression members 13 and three tensile members 18 must be used, a larger member of each can also be used, to provide greater load bearing strength or as a safety factor.

As shown in FIG. 1, the effective length of each of tensile members 18 is adjusted so that each of springs 19 has been stretched sufficiently to exert a tensile force between base member 11 and support member 12.

The spring rate, i.e., the force necessary to produce a unit elongation of springs 19, depends on the magnitude of the loads and/or other forces which may be exerted on the structure, as will be obvious to those skilled in the art. Although springs having different spring rates (as well as different lengths in compression members 13) can be used, it will generally be convenient to use identical tensile members 18 in conjunction with compression members 13 of the same length spaced symmetrically about circles (which need not have the same diameter) in each of base member 11 and support members. Under these conditions, support 10 is symmetrical about a vertical axis, and each of tensile members 18 will exert the same force when the circles on which the ends of members 18 are arranged in parallel planes.

Because of the pivotal connections between compression members 13 and each of base and support members 11 and 12, it will be seen that rotation of support member 12 relative to base member 11 will shorten the distance separating the members, thus tending to relieve the tension exerted by the springs, until there is achieved a rest or equilibrium position at which the tensile force exerted by the springs is at a minimum. Continued rotation of upper support member 12 relative to base member 11 beyond the equilibrium position will increase the distance between these members, thereby stretching the springs and increasing the tensile force exerted thereby.

Figure 2:
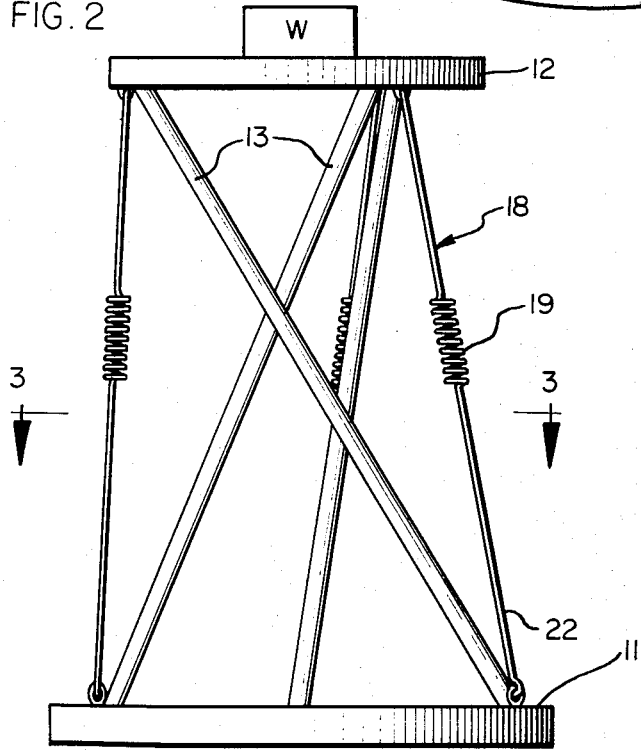
FIG. 2 is a front elevational view of the embodiment of FIG. 1, supporting a weight w.

If a load W is placed on support member 12 as shown in FIG. 2, member 12 will rotate an appropriate distance relative to base member 11, thereby stretching each of springs 19, until the additional tensile force exerted by the springs is sufficient to counterbalance the added weight, whereby a new equilibrium position is reached. The application of a still greater load on support member 12, as depicted by the larger weight W' in FIG. 4, causes upper support member 12 to rotate even further relative to base member 11, thereby causing springs 19 to stretch an additional amount and to exert a greater tensile force sufficient to balance the additional load.

Figure 3:
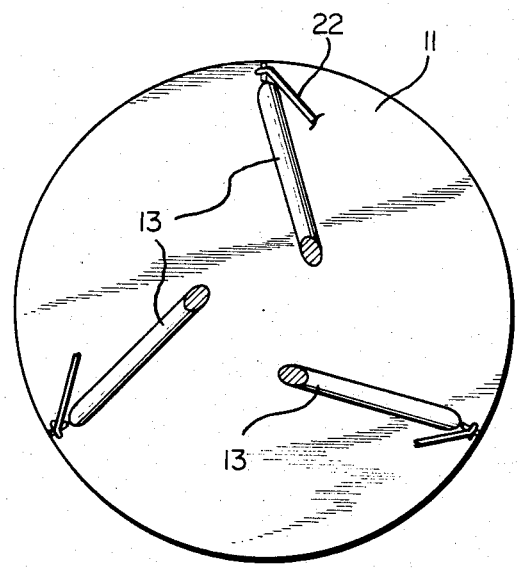
FIG. 3 is a sectional view along the line 3—3 of FIG. 2.

FIGS. 3 and 5 show that as support member 12 tends to rotate under the application of an increasing downward force, compression members 13 approach each other at a point above the center of base member 11. Accordingly, the maximum vertical force which can be applied to the structure is that which causes the compression members to meet or touch at a central point, beyond which further rotation creates a bending moment which might damage compression members 13.

In the condition depicted in FIGS. 2 and 4, the support of the invention is in a state of static equilibrium under a constant downardly applied force represented by weights W and W'. If the applied force, although vertically directed, is not constant but fluctuating, upper member 12 will rotate as necessary in a direction to accommodate the fluctuating force. The support of the invention in such use operates as a passive structure which yields as necessary to accommodate a fluctuating vertical force.

FIG. 6 depicts the operation of the support of the invention when, in addition to a downwardly directed force applied to the support member 12, there is also applied a horizontal force F due, for example, to wind loading or the wave action when the support is located in the sea. In the embodiment of FIG. 6, the springs 19 present in the embodiment of FIG. 1 have been replaced with optional and preferred spring assemblies 19', depicted in FIG. 7, which incorporate a shock- and energy-absorbing feature. As shown in FIG. 7, assembly 19' comprises a cylindrical housing 31, the upper end 32 of which is affixed to cable 22. Cable 22', connected at its upper end to movable plate 32 within housing 31, is free to slide through a suitable opening in lower end 33 of housing 31. Spring 33 is compressed between plate 32 and the lower end 32 of housing. A conventional telescopic shock absorber 34 is connected between plate 32 and upper end 32 of housing 31.

As shown in FIG. 6, one or more of assemblies 19' will yield to accommodate force F until the structure achieves a new equilibrium position. On the removal of force F, e.g., when the wind stops blowing or a wave has passed, the energy stored in spring 33 will tend to create an oscillatory action at a resonant frequency which depends on the length of compression members 13, the spring rate of the spring members and other factors known to those skilled in the art. By suitable selection of such variables, it is possible to adjust the resonant frequency of the structure to a value which differs from that of applied force F, in order to prevent reinforcement of the oscillation which might lead ultimately to structural damage. In the preferred embodiment of FIG. 6, such oscillations are prevented or substantially damped by shock absorber 34.

Preferably, tensile members 18 and compression members 13 should be connected to common points in base member 11 and support member 12, thus effectively minimizing or eliminating any bending moments in either the base member or the support member. Because of physical considerations, however, such a construction may not be possible. For the reason given, however, the attachments of a tensile member and an adjacent compression member are desirably as close to the same point as is practical in a particular structure.

It is evident that the support of the invention can be used to advantage in any application wherein vibrating or oscillating forces are encountered, such as a support for a pier or a drilling tower for offshore drilling subject to regular wave action, or as a support for an elevated water tower subject to wind action, or as a support for a compressor or other cyclically operating equipment having a regular frequency. In all such applications, the support of the invention can be designed to have a resonant frequence differing markedly from that encountered. Alternatively, optional energy absorbing members can be used to prevent undesired oscillations. In use, the compression members of the structure are not subject to any tensile forces which might lead to damage, all fluctuating forces being compensated for solely by the tensile members used in the structure.

The foregoing detailed description has been given for clearness of understanding only and no unnecessary limitations should be understood therefrom as modifications will be obvious to those skilled in the art.

What is claimed is:

1. A support structure comprising:

a lower base member;

an upper support member spaced from said base member and adapted to support a load;

at least three elongated rigid compression members each having its lower end pivoted on said base member and its upper end pivoted on said support member, the points of pivotal connection of said compression members to each of said base and support members being spaced about a closed curve; and at least three elastic tension members interconnecting said base and support members.

2. A structure in accordance with claim 1 wherein each tension member extends between a point of attachment on said base member adjacent an end of one of said compression members and a point of attachment on said support member adjacent an end of a different one of said compression members.

3. A support structure in accordance with claim 1 each wherein said closed curve is a circle about which said support members are symmetrically spaced.

4. A structure in accordance with claim 3 wherein said compression members are of equal length and said tension members exert the same tensile force when the planes determined by the respective ends of said compression members are parallel.

5. A support structure in accordance with claim 1 wherein said tension members include means for absorbing and dissipating energy.

* * * * *